(12) United States Patent
Niiyama et al.

(10) Patent No.: US 8,311,378 B2
(45) Date of Patent: Nov. 13, 2012

(54) OPTICAL FIBER CABLE EQUIPPED WITH OPTICAL CONNECTOR, METHOD FOR INTRODUCING OPTICAL FIBER CABLE, TOWING TOOL USED IN INTRODUCING METHOD, AND OPTICAL CONNECTOR

(75) Inventors: Shinsuke Niiyama, Kanagawa (JP); Takayasu Yamauchi, Kanagawa (JP); Hideaki Tajima, Saitama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 487 days.

(21) Appl. No.: 12/531,955

(22) PCT Filed: Mar. 19, 2008

(86) PCT No.: PCT/JP2008/055135
§ 371 (c)(1),
(2), (4) Date: Oct. 20, 2009

(87) PCT Pub. No.: WO2008/114830
PCT Pub. Date: Sep. 25, 2008

(65) Prior Publication Data
US 2010/0092137 A1    Apr. 15, 2010

(30) Foreign Application Priority Data
Mar. 20, 2007    (JP) ............................. P.2007-073375

(51) Int. Cl.
*G02B 6/36*    (2006.01)
*G02B 6/54*    (2006.01)

(52) U.S. Cl. ............................ 385/48; 385/139; 385/147
(58) Field of Classification Search .................... None
See application file for complete search history.

(56) References Cited

U.S. PATENT DOCUMENTS
4,684,161 A * 8/1987 Egner et al. .................. 294/219

FOREIGN PATENT DOCUMENTS
| JP | 2003-322727 | 11/2003 |
| JP | 2007-052278 | 3/2007 |
| JP | 2007-328290 | 12/2007 |

\* cited by examiner

*Primary Examiner* — Jerry Rahll
(74) *Attorney, Agent, or Firm* — McDermott Will & Emery LLP

(57) ABSTRACT

There is provided an optical-connector-equipped optical fiber cable introducing method, according to which an introducing operation through an existing electrical wiring conduit or the like can be implemented, without damaging an optical fiber cable to be introduced, and with a small towing force. When inserting into a conduit 39 an optical-connector-equipped optical fiber cable 31 in which a grip 19 having a function of engaging with and disengaging from an adaptor is fitted onto a plug frame 9 that covers a ferrule, an introducing operation of the optical-connector-equipped optical fiber cable is implemented by towing and inserting the optical-connector-equipped optical fiber cable 31, from which at least the grip 19 is detached, through the conduit 39 and, thereafter, the grip 19 is attached to the plug frame 9.

7 Claims, 14 Drawing Sheets

OPTICAL FIBER CABLE EQUIPPED WITH OPTICAL CONNECTOR, METHOD FOR INTRODUCING OPTICAL FIBER CABLE, TOWING TOOL USED IN INTRODUCING METHOD, AND OPTICAL CONNECTOR

RELATED APPLICATIONS

This application is the U.S. National Phase under 35 U.S.C. §371 of International Application No. PCT/JP2008/055135, filed on Mar. 19, 2008, which in turn claims the benefit of Japanese Application No. 2007-073375, filed on Mar. 20, 2007, the disclosures of which Applications are incorporated by reference herein.

TECHNICAL FIELD

The present invention relates to an optical fiber cable equipped with an optical connector, a method for introducing the optical fiber cable, a towing tool used in the introducing method, and the optical connector.

BACKGROUND ART

In recent years, in accordance with a progress in establishment of an optical subscriber network, an FTTH (Fiber To The Home), an installation of an optical fiber cable directly into a subscriber's home, is remarkably becoming pervasive in relation to an Internet access.

When installing an optical fiber cable into a subscriber's home, it is convenient to use an optical-connector-equipped optical fiber cable, in which an optical connector is coupled to an end part of the optical fiber cable in advance, in order to facilitate a connection to an adaptor of an indoor optical equipment.

FIGS. 12 and 13 show an example of such an optical-connector-equipped optical fiber cable.

The optical-connector-equipped optical fiber cable 1 is configured such that an optical connector 5 is coupled to an end of an optical fiber cable 3.

The optical connector 5 is what is called an SC connector and, as shown in FIG. 13, includes a ferrule 7 which holds an end part of an optical fiber, a plug frame 9 which covers a circumference of the ferrule 7, a stop ring 13 which is fitted and coupled to a rear end of the plug frame 9 to provide, behind the ferrule 7, a space 11 for connection and accommodation of the optical fiber cable 3, a boot 15 which is fitted onto a rear end of the stop ring 13 to protect the optical fiber cable 3 drawn out of the stop ring 13, and a grip 19 which is disposed on an outer side of the plug frame 9 to serve as a gripping portion when engaging with or disengaging from (attaching to or detaching from) an adaptor 17 of an optical equipment.

The optical fiber cable 3 extending from the space 11 along the boot 15 is fixed and positioned by means of a fastening ring 21 which is tightly fastened onto the rear end of the stop ring 13 and an auxiliary ring 22 which engages with a rear end of the fastening ring 21.

The ferrule 7 accommodated in the plug frame 9 is positionally regulated toward the front by contacting a diameter-enlarged portion 7a thereof to a step (a diameter-reduced portion) 9a on an inner periphery of the plug frame 9. The ferrule 7 is pressed against the step 9a by a compression coil spring 24 which is fitted between the diameter-enlarged portion 7a and the stop ring 13. Due to the elastic support by the compression coil spring 24, the ferrule 7 is rearwardly displaced in accordance with a butting force against an abutting object when connecting the optical connector 5 to the adaptor 17, whereby a stable pressing force required for the connection is obtained.

The optical connector 5 is usually provided with a cap 26 which is fitted, at the time of storage, on an end portion to protect the ferrule 7.

A method shown in FIGS. 14 and 15 has hitherto been proposed as an introducing method for inserting the optical-connector-equipped optical fiber cable 1 described above through an electrical wiring conduit in a subscriber's home.

In this method, a holder 27 having a towing portion 27a, to which a wire or the like for towing is hooked, and configured to be able to attach to and detached from the grip 19 of the optical connector 5 is provided, and the holder 27 is attached to an end of the optical connector 5 when inserting through an electrical wiring conduit 28 in a subscriber's home and is detached after the insertion (see, e.g., Patent Document 1).

Patent Document 1: Japanese Published Patent Application: JP 2003-322727A

DISCLOSURE OF THE INVENTION

Problems to be Solved by the Invention

However, in many cases, the electrical wiring conduit 28 in a subscriber's home is usually a CD duct (a flexible electrical wiring duct made of a synthetic resin: Combined Duct) that is used for laying a telephone wire and having an inner diameter of 16 mm.

In contrast, a cross-sectional profile of the grip 19 disposed on the outer side of the SC-type optical connector 5 is, as shown in FIG. 4, a rectangular section of 9×8.3 mm, and a section size becomes still larger by attaching the towing holder 27.

In particular, when a telephone wire or a LAN cable is already laid in the existing electrical wiring conduit 28, there has been a likelihood of encountering a difficulty in additionally inserting an optical-connector-equipped optical fiber cable, or inducing an excessive friction against another already-laid wire during the introducing operation, thereby damaging the existing telephone wire or the LAN cable, or the optical-connector-equipped optical fiber cable that is additionally laid.

An object of the present invention is to solve the problems described above, and to provide an optical fiber cable equipped with an optical connector, a method for introducing the optical fiber cable, a towing tool used in the introducing method, and the optical connector, according to which existing wiring or the like is not damaged when introducing the optical-connector-equipped optical fiber cable through an electric wiring conduit or the like, and further, the introducing operation can be easily carried out with a small towing force.

Means for Solving the Problems (1) To solve the problems described above, an optical-connector-equipped optical fiber cable introducing method according to the present invention is an optical-connector-equipped optical fiber cable introducing method for inserting through a conduit an optical-connector-equipped optical fiber cable, in which a grip having a function of engaging with and disengaging from an adaptor is attached onto a plug frame that covers a ferrule, characterized by towing and inserting the optical-connector-equipped optical fiber cable, from which at least the grip is detached, through the conduit and, subsequently, attaching the grip to the plug frame.

(2) Further, to solve the problems described above, an optical-connector-equipped optical fiber cable according to the present invention is an optical-connector-equipped optical fiber cable connected with an optical connector in which a grip having function of engaging with and disengaging from an adaptor is attached onto a plug frame that covers a ferrule, characterized in that a towing tool is detachably attached to a joint which is formed on the plug frame or on a stop ring fitted to the plug frame.

(3) Further, to solve the problems described above, an optical connector according to the present invention is an optical connector including at least a ferrule which holds an end part of an optical fiber and a plug frame which covers the ferrule, characterized in that the plug frame or a stop ring fitted to the plug frame comprises a joint to which a towing tool is detachably attached.

(4) Further, the optical connector described above may be configured such that the joint is a helical groove which is formed in one of an inner wall and an outer wall of the plug frame.

(5) Further, the optical connector described above may be configured such that the joint that is a projection which is formed on an outer peripheral portion of the stop ring for fitting to the plug frame.

(6) Further, to solve the problems described above, a towing tool according to the present invention is a towing tool which is attachable to the optical connector as set forth in any one of (3) to (5) described above, and the towing tool is characterized in that it has an engaging portion which is engageable with the joint formed on the plug frame of the optical connector or on the stop ring fitted to the plug frame.

(7) Further, the towing tool of (6) described above is characterized in that it also serves as a protective cap that covers and protects a front part of the ferrule.

Advantages of the Invention

According to the optical-connector-equipped optical fiber cable and the introducing method therefor of the present invention, when inserting the optical-connector-equipped optical fiber cable through a conduit, the grip causing an increase in the outside dimension of the optical connector is detached in advance to carry out the insertion in a state in which the optical connector is trimmed down, and the grip is reattached after completing the insertion to bring the optical connector back to a normally-used configuration.

Therefore, even in a case in which existing wirings such as a telephone wire and a LAN cable are already present in the conduit, it is possible to suppress interference or friction with the existing wirings so that the existing wirings or the optical fiber cable to be introduced is less likely to be damaged, and to facilitate the introducing operation through the conduit.

Because the optical connector according to the present invention has, the plug frame or the stop ring which is one of the components thereof, the joint to which the towing tool used for pulling during the introducing operation through the conduit is detachably attached, the attaching operation and the detaching operation of the towing tool are facilitated so that the introducing operation can be made more efficient.

The towing tool according to the present invention is configured to have the engaging portion which engages with the joint formed on the plug frame or on the stop ring, which is one of the components of the optical connector, so that it is easily attachable to and detachable from the optical connector by engagement and disengagement between of the joint and the engaging portion

EXPLANATION OF REFERENCE NUMERALS

3 Optical Fiber Cable,
5 Optical Connector,
7 Ferrule,
9 Plug Frame,
9*b* Fitting Cylindrical Portion,
13 Stop Ring,
13*a* Joint,
15 Boot,
17 Adapter,
19 Grip,
31 Optical-Connector-Equipped Optical Fiber Cable,
33 Optical Connector,
35 Towing Toll,
35*a* Engaging Portion,
36 Joint,
41 Optical-Connector-Equipped Optical Fiber Cable,
43 Towing Tool,
43*c* Engaging Portion

BEST MODE FOR CARRYING OUT THE INVENTION

Hereinafter, preferred embodiments of an optical-connector-equipped optical fiber cable, a method for introducing the optical fiber cable, and a towing tool used in the introducing method, and an optical connector according to the present invention will be described in detail with reference to the drawings.

Figure 1:
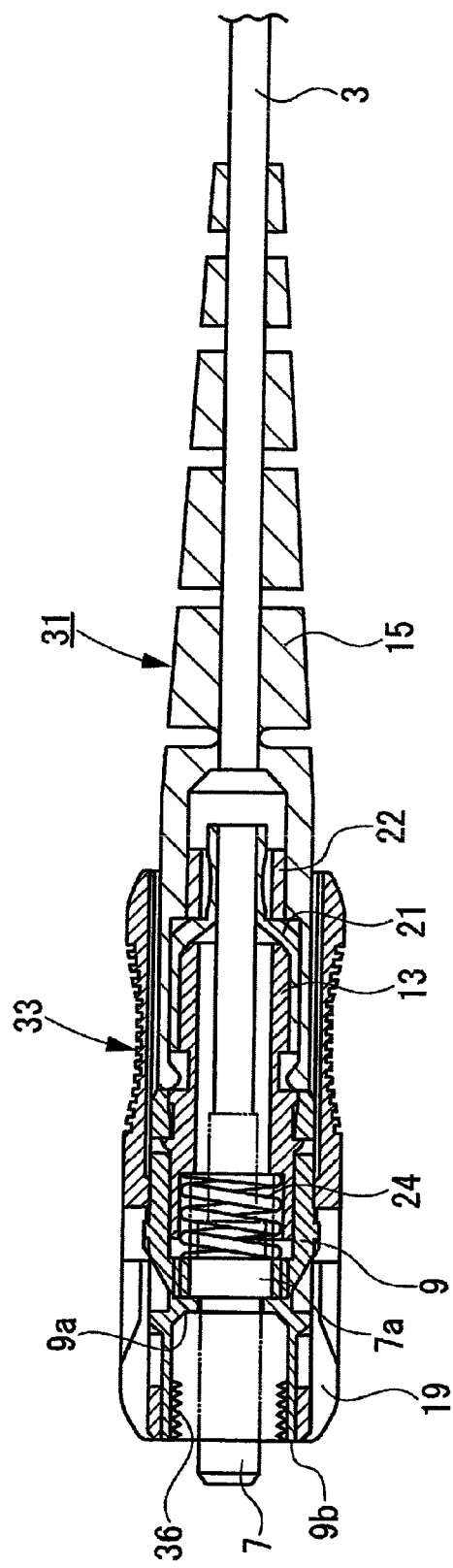
FIG. 1 is a longitudinal sectional view of a first embodiment of an optical-connector-equipped optical fiber cable according to the present invention.
Figure 2:
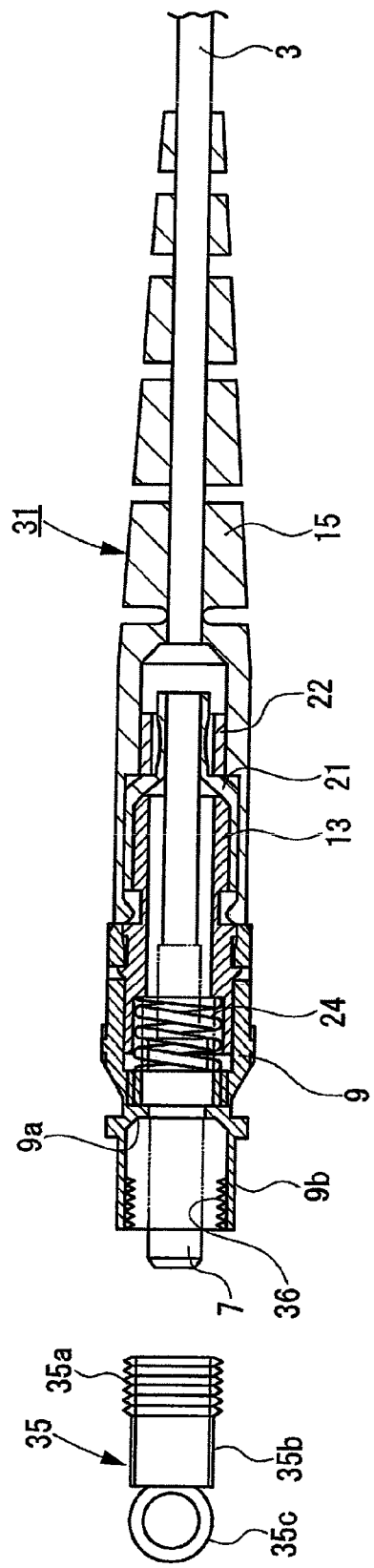
FIG. 2 is a longitudinal sectional view in which a grip is detached from an optical connector of the optical-connector-equipped optical fiber cable shown in FIG. 1.
Figure 3:
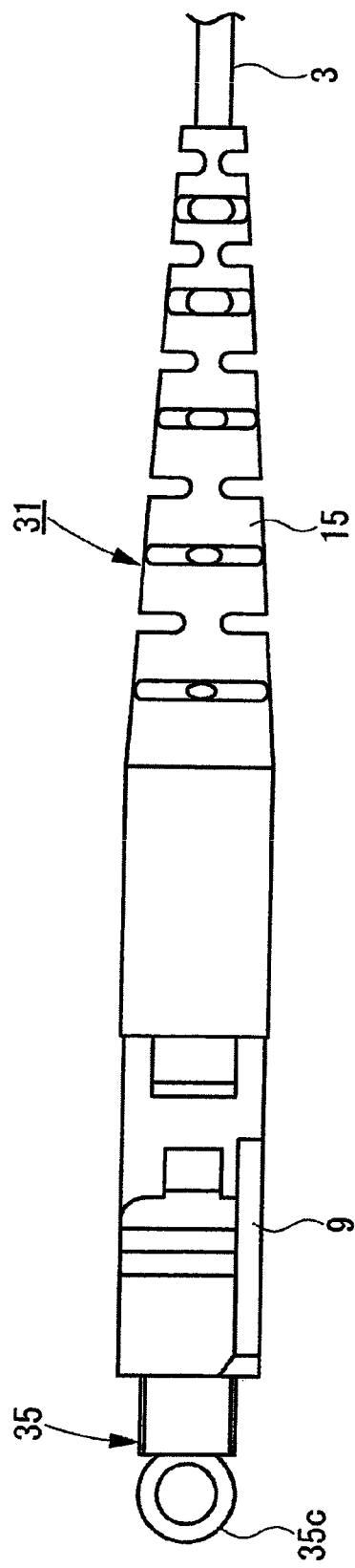
FIG. 3 is an external view in which a towing tool is attached to the optical-connector-equipped optical fiber cable shown in FIG. 2.
Figure 4:
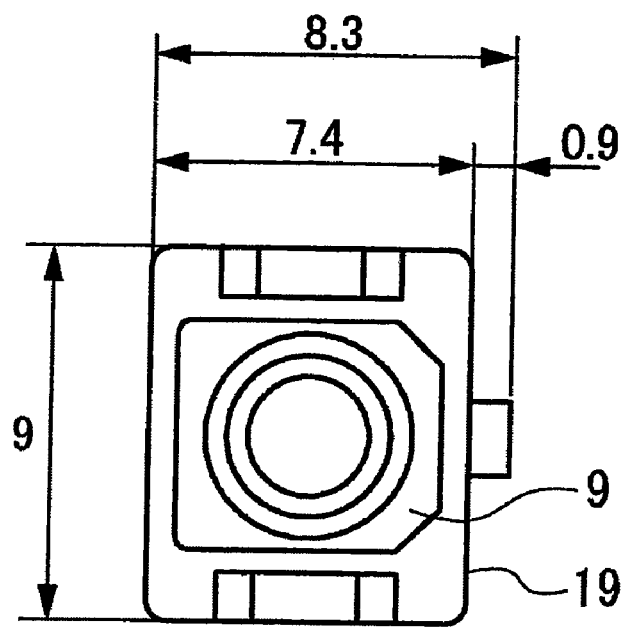
FIG. 4 is a front view showing a profile of the optical connector shown in FIG. 1.
Figure 5:
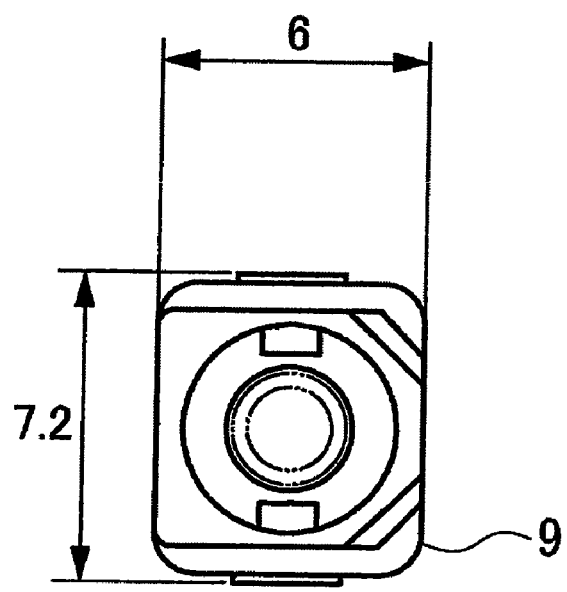
FIG. 5 is a front view showing a profile of the optical connector shown in FIG. 2 (from which the grip is detached).

FIG. 1 is a longitudinal sectional view of a first embodiment of an optical-connector-equipped optical fiber cable according to the present invention, FIG. 2 is a longitudinal sectional view in which a grip is detached from the optical connector, FIG. 3 is an external view in which a towing tool is attached to the optical connector from which the grip is detached, FIG. 4 is a front view showing a profile of the optical connector, and FIG. 5 is a front view showing a profile of the optical connector from which the grip is detached.

An optical-connector-equipped optical fiber cable 31 shown in FIG. 1 is configured such that an optical connector 33 is coupled to an end of an optical fiber cable 3.

The optical connector 33 is a partial modification of the optical connector 5 shown in FIGS. 12 and 13, and configurations that are the same as the members and portions already described in connection with FIGS. 12 and 13 will be assigned the same reference numerals or equivalent reference numerals and description thereof will be simplified or omitted.

Figure 12:
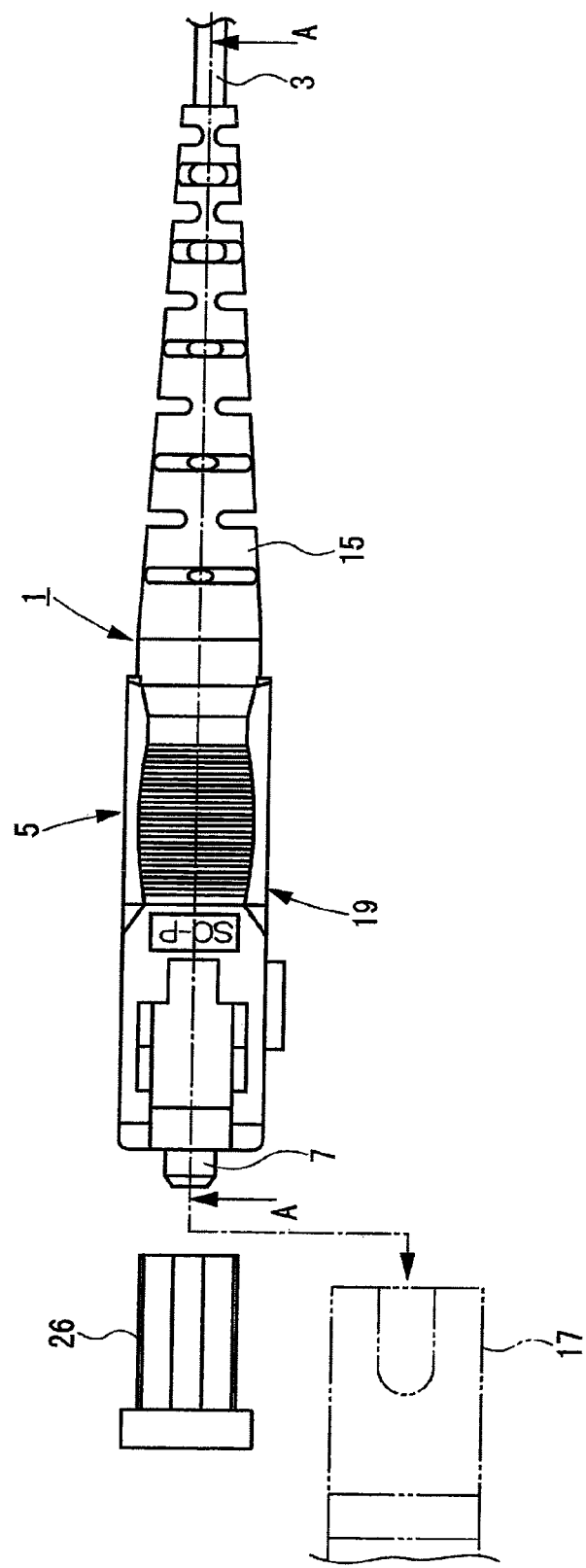
FIG. 12 is a plan view of an optical-connector-equipped optical fiber cable which is to be introduced.

The optical connector 33 is what is called an SC connector and, as shown in FIG. 1, includes a ferrule 7 which holds an end part of an optical fiber, a plug frame 9 which covers a circumference of the ferrule 7, a stop ring 13 which is fitted and coupled to a rear end of the plug frame 9, a boot 15 which is fitted onto a rear end of the stop ring 13 to protect the optical fiber cable 3 drawn out of the stop ring 13, and a grip 19 which is disposed on an outer side of the plug frame 9 to serve as a gripping portion when engaging with or disengaging from (attaching to or detaching from) an adaptor 17 of an optical equipment (see FIG. 12).

The optical fiber cable 3 extending from the ferrule 7 is fixed and positioned by means of a fastening ring 21 which is tightly fastened onto the rear end of the stop ring 13 and an auxiliary ring 22 which engages with a rear end of the fastening ring 21.

The ferrule 7 accommodated in the plug frame 9 is positionally regulated toward the front by contacting a diameter-enlarged portion 7a, which is formed on an axially middle portion, to a step (a diameter-reduced portion) 9a on an inner periphery of the plug frame 9. The ferrule 7 is pressed against the step 9a by a compression coil spring 24 which is fitted between the diameter-enlarged portion 7a and the stop ring 13. Due to the elastic support by the compression coil spring 24, the ferrule 7 is rearwardly displaced in accordance with a butting force against an abutting object when connecting the optical connector 33 to the adaptor 17, whereby a stable pressing force required for the connection is obtained.

Figure 13:
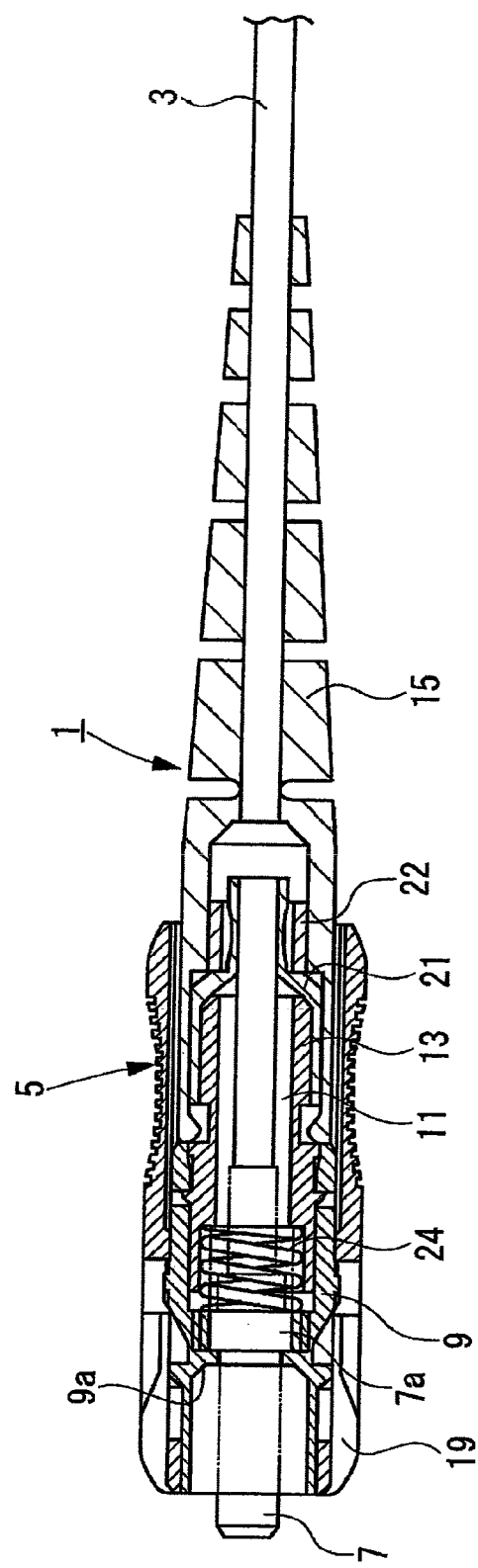
FIG. 13 is a sectional view taken along the line A-A in FIG. 12.

What is different in the optical connector 33 of the present embodiment from the optical connector 5 shown in FIGS. 12 and 13 is that a joint 36 for detachably coupling the towing tool 35 is formed on an inner periphery of a fitting cylindrical portion 9b which is at an end of the plug frame 9.

The towing tool 35 is configured such that, as shown in FIG. 2, a ring 35c, to which a towing wire or the like is to be tied, is integrally formed on an end of a cylindrical portion 35b, an outer periphery of which is formed with an engaging portion 35a connectable to the joint 36 of the plug frame 9.

The cylindrical portion 35b is configured in a shape of a closed-end cylinder in which an end part on a side of the ring 35c is closed, and serves to cover and protect a front side of the ferrule 7 protruding out of the plug frame 9. Accordingly, the towing tool 35 also serves as a protective cap that protects an end of the optical connector 33.

In the present embodiment, the joint 36 formed on the inner periphery of the fitting cylindrical portion 9b of the plug frame 9 is a helical groove serving as a female thread.

Further, the engaging portion 35a of the towing tool 35 is a male thread that engages with (screwed into) the joint 36 of the plug frame 9. Therefore, the towing tool 35 is joined and fixed to the plug frame 9 by screwing the engaging portion 35a serving a male thread into the joint 36, and can be detached from the plug frame 9 by releasing the screw engagement between the engaging portion 35a and the joint 36 and, thus, is easily attachable and detachable with respect to the plug frame 9.

The outside dimension of the towing tool 35 in a front view is set within the range of outside dimension of the plug frame 9 in the front view shown in FIG. 5. That is, the towing tool 35 is configured to be smaller than the plug frame 9 in terms of an outer shape in the front view.

Next, an introducing method for inserting the optical-connector-equipped optical fiber cable 31 described above through a conduit installed in a subscriber's home or the like will be described.

First, the optical connector 33 coupled to the end of the optical fiber cable 3 is brought into a state in which the grip 19 is detached as shown in FIG. 2. Subsequently, as shown in FIG. 3, the towing tool 35 is coupled to the end of the plug frame 9.

When the grip 19 is attached, the outside dimension of the optical connector 33 in the front view becomes the outside dimension of the grip 19, and is in a rectangular shape of 9×8.3 mm as shown in FIG. 4. When the grip 19 is detached, the outside dimension of the optical connector 33 in the front view becomes the outside dimension of the plug frame 9, and is in a rectangular shape of 7.2×6 mm as shown in FIG. 5, which is notably slim as compared with the state in which the grip 19 is attached.

Figure 6:
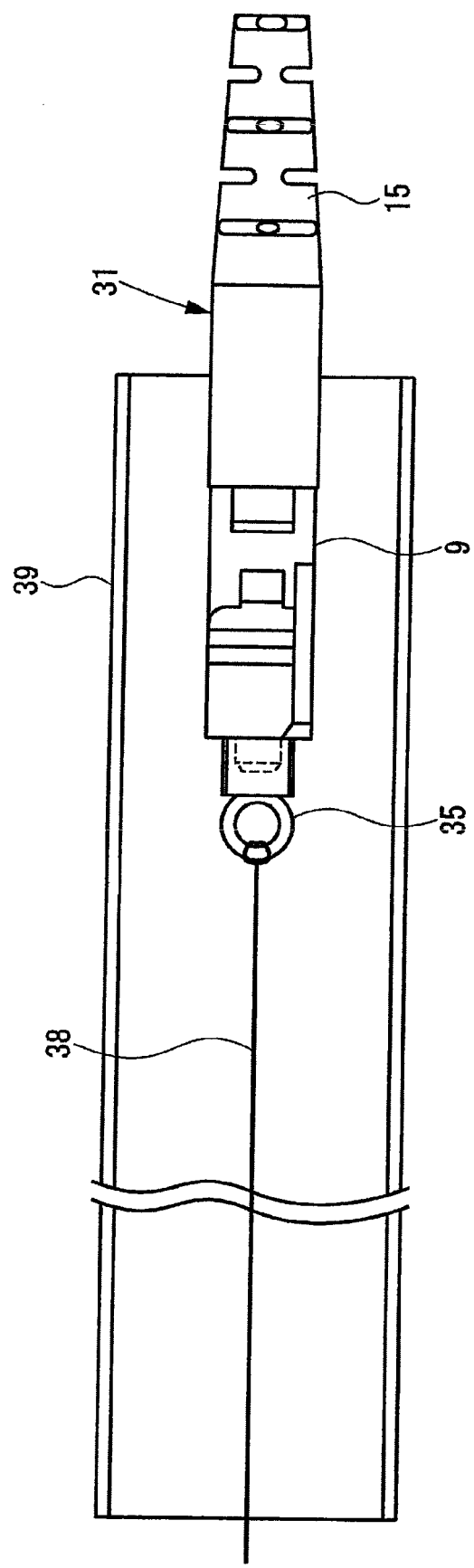
FIG. 6 is an explanatory view in which the optical-connector-equipped optical fiber cable with the towing tool shown in FIG. 3 is inserted into a conduit.
Figure 7:
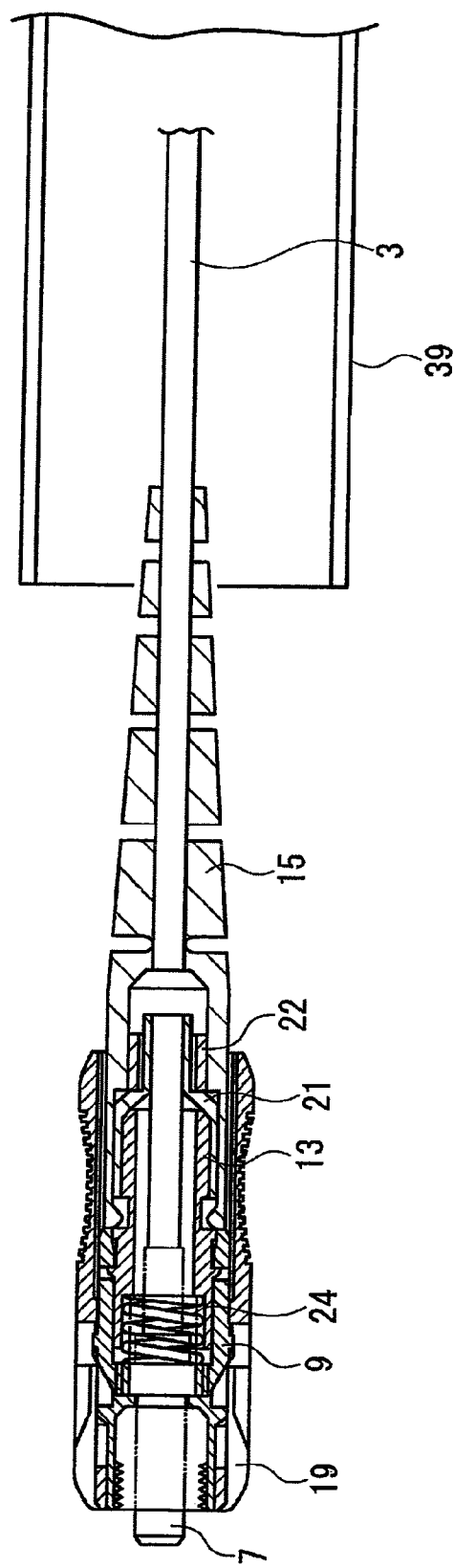
FIG. 7 is a longitudinal sectional view in which the grip is reattached to the optical connector of the optical-connector-equipped optical fiber cable after the introduction through the conduit.
Figure 8:
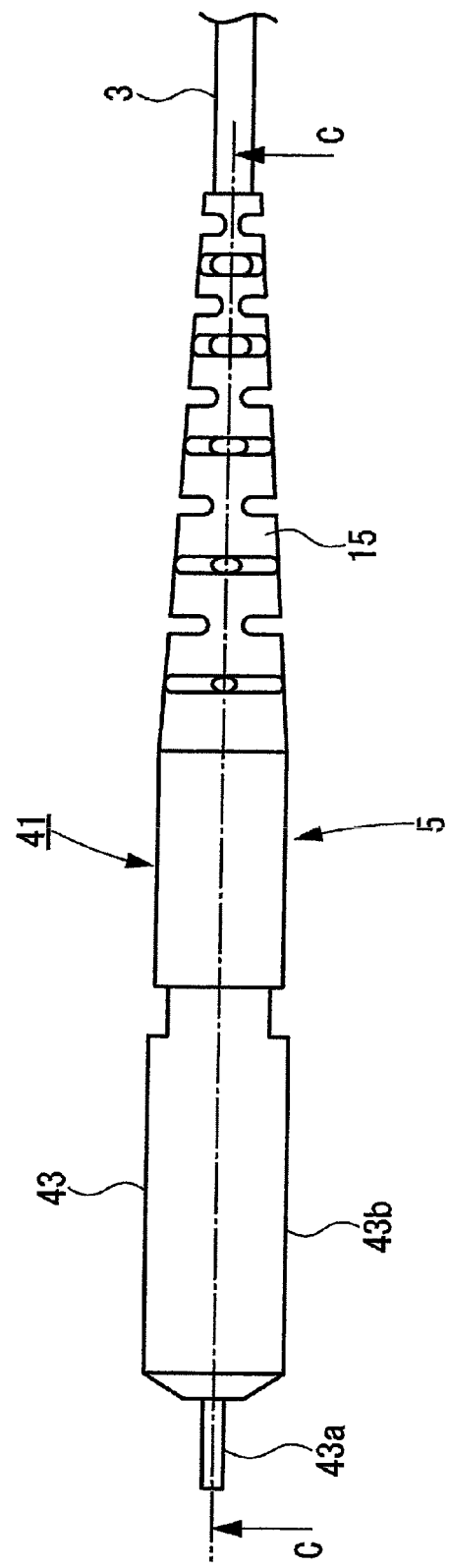
FIG. 8 is an external view of a second embodiment of an optical-connector-equipped optical fiber cable according to the present invention when inserting it into a conduit.
Figure 9:
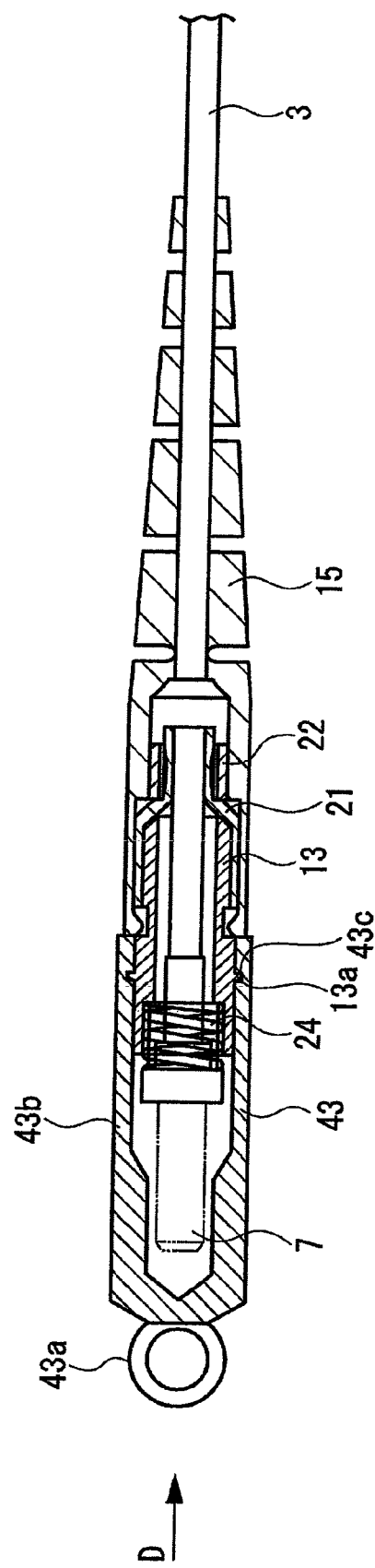
FIG. 9 is a sectional view of the optical-connector-equipped optical fiber cable shown in FIG. 8, taken along the line C-C.
Figure 10:
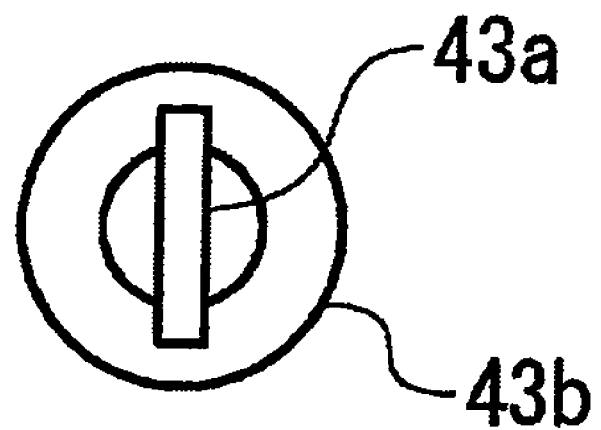
FIG. 10 is a view of a towing tool shown in FIG. 9 when viewed in the direction of an arrow D.

Then, as shown in FIG. 6, a towing wire 38 is tied to the towing tool 35 which is joined to the plug frame 9 to insert into the conduit 39 of the subscriber's home, and when the insertion through the conduit 39 is completed, as shown FIG. 7 the towing tool 35 is detached from the plug frame 9 and the grip 19 is reattached to the plug frame 9, whereby the entire introducing process through the conduit 39 is completed.

According to the foregoing optical-connector-equipped optical fiber cable 31 and the introducing method for inserting the optical-connector-equipped optical fiber cable 31 through the conduit 39 of the first embodiment of the present invention, when inserting into the conduit 39, as shown in FIG. 6, the grip 19 causing an increase in the outside dimension is detached in advance to carry out the insertion in a state in which the outside dimension of the optical connector 33 is trimmed down, and as shown in FIG. 7, the grip 19 is reattached after completing the insertion through the conduit 39 to bring the optical connector 33 back to a normally-used configuration.

Therefore, even in a case in which existing wirings such as a telephone wire and a LAN cable are already present in the conduit 39, it is possible to suppress interference or friction with the existing wirings so that the existing wirings or the optical fiber cable to be introduced is less likely to be damaged and, further, it is possible to carry out the introducing operation with a small towing force so that the introducing operation through the conduit can be facilitated.

Further, because the optical connector 33 used in the optical-connector-equipped optical fiber cable 31 of the first embodiment has the joint 36 which is disposed on the plug frame 9, which is one of the components thereof, and to which the towing tool 35 used for pulling during the introducing operation through the conduit 39 is detachably attached, the attaching operation and the detaching operation of the towing tool 35 are facilitated so that the introducing operation can be made more efficient.

Further, the joint 36 provided on the plug frame 9 of the optical connector 33 of the present embodiment is a helical groove engraved on the inner periphery of the fitting cylindrical portion 9b at the end of the plug frame 9, and the joint 36 functions as a female thread to enable a firm connection of the towing tool 35 by screw engagement. Further, because it is configured such that the towing tool 35 is screwed inside the fitting cylindrical portion 9b, an increase in the outside dimension is obviated, and is suitable for downsizing the optical connector 33 to be inserted through the conduit 39.

In a case in which the joint 36 is configured as a helical groove, it is also possible to provide it on an outer periphery of the fitting cylindrical portion 9b. In this case, an engaging portion 35a serving as a female thread can be formed on the inner periphery of the cylindrical portion 35b of the towing tool 35.

Further, according to the present embodiment, the towing tool 35 used during the introducing operation through the conduit 39 is configured to have the engaging portion 35a which engages with the joint 36 formed on the plug frame 9, which is one of the components of the optical connector 33, so that it is easily attachable to and detachable from the optical connector 33 by engagement and disengagement between of the joint 36 on the plug frame 9 and the engaging portion 35a.

The optical connector 33 described above may be further downsized by also detaching the plug frame 9 in addition to the detachment of the grip 19, so as to further facilitate the introducing operation through the conduit 39. In order to enable the introducing operation through the conduit 39 in a state in which the plug frame 9 is detached, it is advantageous to couple a towing tool to the stop ring 13 which has been fitted and connected to the plug frame 9.

FIGS. 8 to 11 show a second embodiment of an optical-connector-equipped optical fiber cable which enables a connection of the towing tool to the stop ring 13, and an introducing method therefor.

An optical-connector-equipped optical fiber cable 41 of the second embodiment is configured such that, in an ordinary state, the optical connector 5 shown in FIGS. 12 and 13 is coupled to the end of the optical fiber cable 3. However, as shown in the drawings, the grip 19 and the plug frame 9 are detached from the optical connector 5 when introducing into the conduit 39, and a towing tool 43 is attached to the stop ring 13 instead.

In the drawings, common configurations of the optical connector 5 are assigned the same reference numerals, and description thereof will be omitted.

The towing tool 43 used for the optical-connector-equipped optical fiber cable 41 of the second embodiment includes a ring 43a to which a towing wire or the like is tied, a cylindrical portion 43b which is continuously formed from the ring 43a to cover and to be attached to the front parts of the ferrule 7 and the stop ring 13 of the optical connector 5, and an engaging portion 43c which is provided on the cylindrical portion 43b and engages with a joint 13a formed on the stop ring 13, and is detachably attached to the stop ring 13 by engagement and disengagement between the joint 13a and the engaging portion 43c.

In the present embodiment, the joint 13a formed on the stop ring 13 is a protrusion which is formed on an outer periphery of the stop ring 13 to engage with the plug frame 9.

The engaging portion 43c provided on the towing tool 43 is an engagement hole (a recess) which engages with the joint 13a being the protrusion.

The cylindrical portion 43b of the towing tool 43 is configured in a shape of a closed-end cylinder in which an end part on a side of the ring 43a is closed, and serves to cover and protect a front side of the ferrule 7 protruding out of the stop plug 13. Accordingly, the towing tool 43 also serves as a protective cap that protects an end of the optical connector 5.

When inserting the optical-connector-equipped optical fiber cable 41 of the second embodiment into the conduit 39, the grip 19 and the plug frame 9 are detached from the optical connector 5 in advance, and the stop ring 13 is joined to the towing tool 43 instead.

Figure 11:
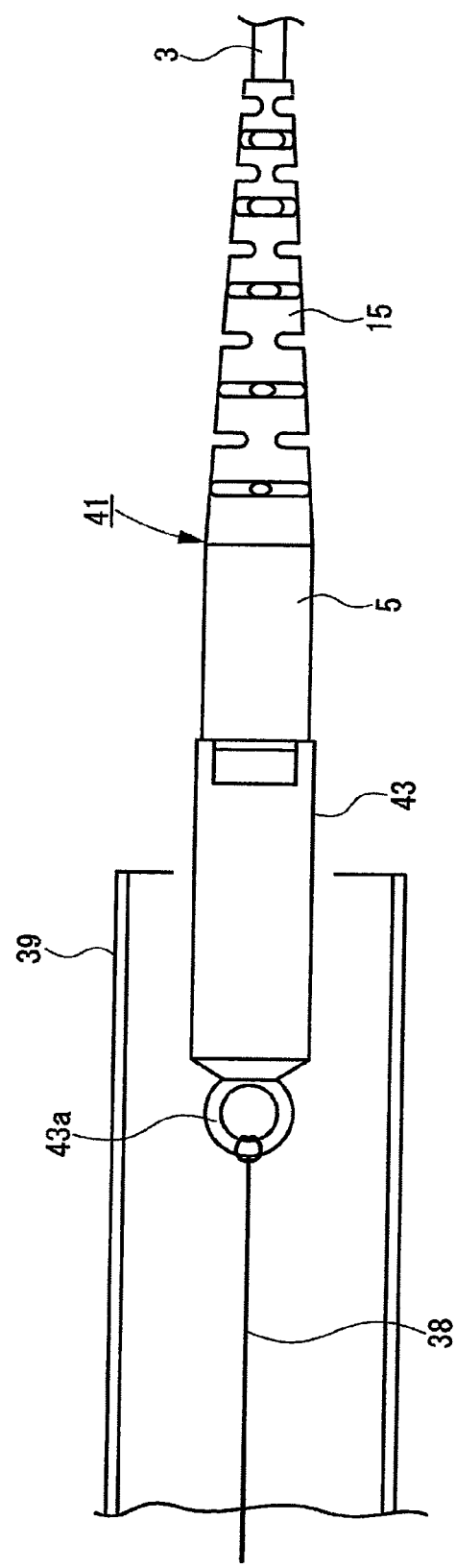
FIG. 11 is an explanatory view in which the optical-connector-equipped optical fiber cable shown in FIG. 8 is inserted into the conduit.

Next, as shown in FIG. 11, a wire 38 is tied to the towing tool 43 that is joined to the stop ring 13 to insert into the conduit 39.

When the insertion through the conduit 39 is completed, although not shown in the drawings, the towing tool 43 is detached from the stop ring 13 and, then, the plug frame 9 is fitted and attached to the stop ring 13 and the grip 19 is fitted onto the plug frame 9, whereby the entire introducing process is completed.

Also in the case of the optical-connector-equipped optical fiber cable 41 and the introducing method therefor of the second embodiment, when inserting into the conduit 39, like in the first embodiment, the grip 19 and the plug frame 9 causing an increase in the outside dimension is detached in advance to carry out the insertion in a state in which the outside dimension of the optical connector 5 is trimmed down, and the plug frame 9 and the grip 19 are reattached after completing the insertion through the conduit 39 to bring the optical connector 5 back to a normally-used configuration.

Therefore, even in a case in which existing wirings such as a telephone wire and a LAN cable are already present in the conduit 39, it is possible to suppress interference or friction with the existing wirings so that the existing wirings or the optical fiber cable to be introduced is less likely to be damaged, and to facilitate the introducing operation through the conduit.

Further, in the second embodiment, because the stop ring 13, which is one of the components of the optical connector 5, has the joint 13a to which the towing tool 43 used for towing during the introducing operation detachably attached, the attaching operation of the towing tool 43 and the detaching operation of the towing tool 43 are facilitated so that the introducing operation can be made more efficient.

Furthermore, according to the present embodiment, the joint 13a provided on the stop ring 13 to detachably join the towing tool 43 is the protrusion which is formed on the stop ring 13 for the engagement connection between the plug frame 9 and the stop ring 13 and is also utilized for joining the towing tool 43.

Therefore, there is no need to modify the configuration of the existing stop ring 13 for joining the towing tool 43, and a configuration for joining the towing tool 43 can be inexpensively obtained.

In order to confirm the advantages of each of the embodiments described above, applicant et al. conducted an introducing test result.

Figure 14:
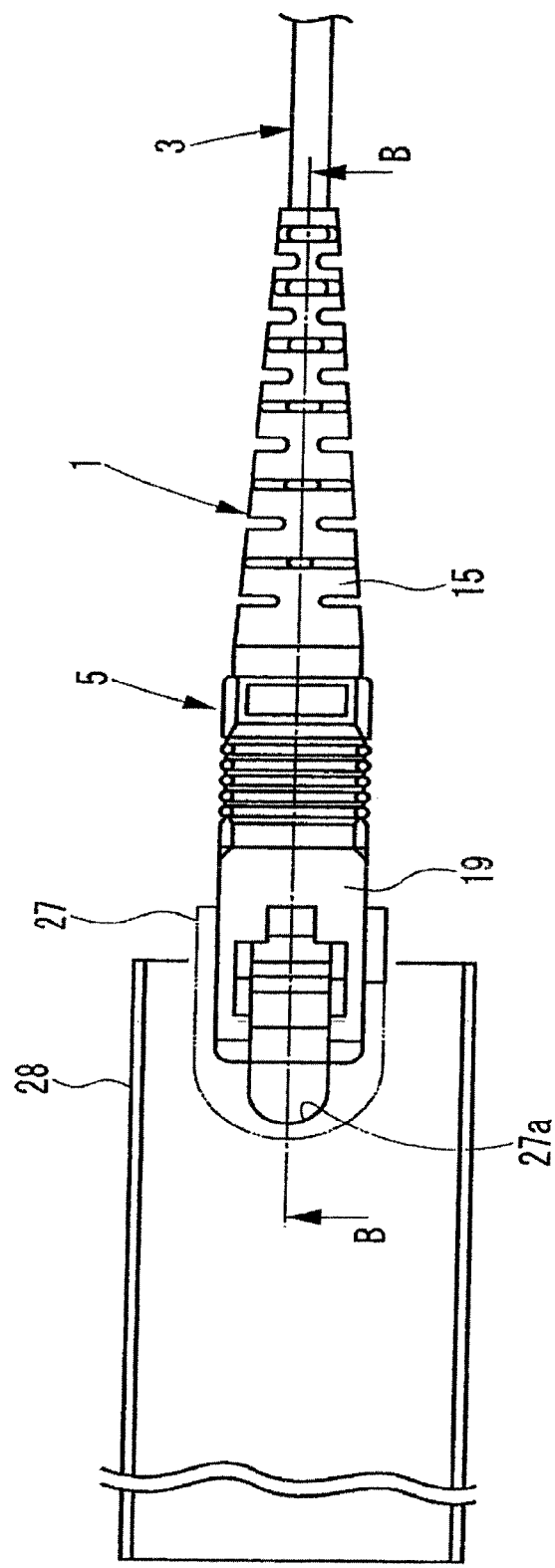
FIG. 14 is an explanatory view of a conventional method for introducing an optical-connector-equipped optical fiber cable.
Figure 15:
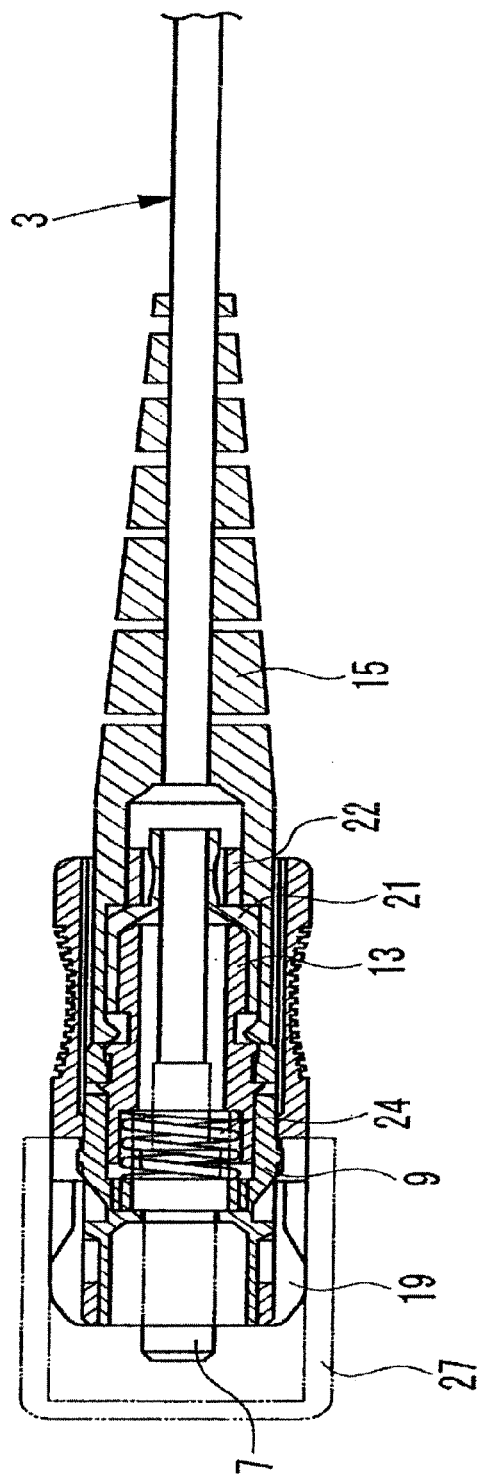
FIG. 15 is a sectional view taken along the line B-B in FIG. 14.

A conduit used is a CD duct having an inner diameter of 16 mm, a conduit length of 10 m, and bends at three locations with a radius being six times the inner diameter D (16 mm) of the conduit, and one metal telephone wire is already laid inside the conduit, and under the condition of the maximum towing force of 7 kgf, introducing operations were tested for the case of the conventional introducing method in which the optical connector 5 is maintained attached to the grip 19 as shown in FIG. 14, the case of the introducing method of the first embodiment of the present invention shown in FIG. 6, and the case of the introducing method of the second embodiment of the present invention shown in FIG. 11.

As a result, in the case of the conventional introducing method shown in FIG. 14, the introducing operation was failed.

In contrast, it was possible to smoothly complete the introducing operations in the case of the first embodiment of the present invention shown in FIG. 6 and the case of the second embodiment of the present invention shown in FIG. 11.

The maximum towing force during the introducing operation in the case of the first embodiment was 6 kgf, the maximum towing force during introducing operation in the case of the second embodiment was 4 kgf, and it was confirmed that the maximum towing force exerted during an introducing operation can be reduced as the outside dimension at the time of the introducing operation becomes smaller.

While the present invention has been described in detail and with reference to specific embodiments, it is apparent to those skilled in the art that various changes and modifications can be made therein without departing from the spirit and scope of the present invention. The present application is based on Japanese Patent Application (JP 2007-073375) filed on Mar. 20, 2007, the content of which is incorporated herein for reference.

The invention claimed is:

1. An optical-connector-equipped optical fiber cable introducing method for inserting through a conduit an optical-connector-equipped optical fiber cable, in which a grip having a function of engaging with and disengaging from an adaptor is attached onto a plug frame that covers a ferrule, the method comprising:
   towing and inserting the optical-connector-equipped optical fiber cable, from which at least the grip is detached, through the conduit; and
   subsequently, attaching the grip to the plug frame.

2. An optical-connector-equipped optical fiber cable comprising:
   an optical fiber cable; and
   an optical connector coupled to the optical fiber cable,
   wherein the optical connector comprises:
   a ferrule which holds an end part of an optical fiber of the optical fiber cable;
   a plug frame which covers the ferrule;
   a stop ring which is fitted to the plug frame to provide a space for accommodating the optical fiber cable; and
   a grip which is attached onto the plug frame, wherein the grip is adapted to be engaged with and disengaged from an adapter of an optical equipment,
   wherein one of the plug frame and the stop ring comprises a joint adapted to be detachably fitted with a towing tool comprising an engaging portion which is engageable with the joint.

3. An optical connector comprising:
   a ferrule adapted to hold an end part of an optical fiber of an optical fiber cable;
   a plug frame which covers the ferrule;
   a stop ring which is fitted to the plug frame to provide a space for accommodating the optical fiber cable; and
   a grip which is attached onto the plug frame, wherein the grip is adapted to be engaged with and disengaged from an adapter of an optical equipment,
   wherein one of the plug frame and the stop ring comprises a joint adapted to be detachably fitted with a towing tool.

4. The optical connector according to claim 3, wherein the joint comprises a helical groove which is formed in one of an inner wall and an outer wall of the plug frame.

5. The optical connector according to claim 3, wherein the joint comprises a protrusion which is formed on an outer peripheral portion of the stop ring for fitting to the plug frame.

6. A towing tool adapted to be attached to an optical connector,
   wherein the optical connector comprises:
   a ferrule adapted to hold an end part of an optical fiber of an optical fiber cable;
   a plug frame which covers the ferrule; and
   a stop ring which is fitted to the plug frame to provide a space for accommodating the optical fiber cable, and
   a grip which is attached onto the plug frame, wherein the grip is adapted to be engaged with and disengaged from an adapter of an optical equipment,
   wherein one of the plug frame and the stop ring comprises a joint, and
   wherein the towing tool comprises an engaging portion which is engageable with the joint.

7. The towing tool according to claim 6, wherein the towing tool also serves as a protective cap that covers and protects a front part of the ferrule.

* * * * *